United States Patent
Patel et al.

(10) Patent No.: US 10,332,110 B2
(45) Date of Patent: Jun. 25, 2019

(54) SYSTEM AND METHOD FOR AUTHENTICATING A PAYMENT TRANSACTION

(71) Applicant: Barclays Bank PLC, London (GB)

(72) Inventors: Pratik Patel, Oadby (GB); James Gardiner, Newport Pagnell (GB)

(73) Assignee: BARCLAYS SERVICES LIMITED, London (GB)

( * ) Notice: Subject to any disclaimer, the term of this patent is extended or adjusted under 35 U.S.C. 154(b) by 0 days.

(21) Appl. No.: 13/669,781

(22) Filed: Nov. 6, 2012

(65) Prior Publication Data

US 2013/0226800 A1  Aug. 29, 2013

(51) Int. Cl.
  *G06Q 20/40* (2012.01)
  *G06Q 20/32* (2012.01)
  *H04L 29/06* (2006.01)
  *H04W 4/02* (2018.01)

(52) U.S. Cl.
  CPC ....... *G06Q 20/401* (2013.01); *G06Q 20/3224* (2013.01); *H04L 63/0853* (2013.01); *H04L 63/107* (2013.01); *H04W 4/02* (2013.01)

(58) Field of Classification Search
  CPC .. H04L 63/0853; H04L 63/0807; G06Q 40/00
  USPC ......................................................... 705/44
  See application file for complete search history.

(56) References Cited

U.S. PATENT DOCUMENTS

| 7,669,759 B1 | 3/2010 | Zettner |
| 7,752,107 B1* | 7/2010 | Bent et al. ................ 705/35 |
| 2002/0025796 A1 | 2/2002 | Taylor et al. |
| 2003/0097331 A1* | 5/2003 | Cohen .......................... 705/39 |
| 2003/0169881 A1 | 9/2003 | Niedermeyer |
| 2004/0133516 A1* | 7/2004 | Buchanan et al. ............ 705/42 |
| 2005/0267843 A1* | 12/2005 | Acharya et al. .............. 705/42 |
| 2007/0084913 A1 | 4/2007 | Weston |

(Continued)

FOREIGN PATENT DOCUMENTS

| EP | 1286285 A1 | 2/2003 |
| GB | 2 427 059 A | 12/2006 |

(Continued)

OTHER PUBLICATIONS

L. Francis, Keith Mayes, Gerhard Hancke, K. Markantonakis, "A Location Based Security Framework for Authenticating Moble Phones", Nov. 29, 2010, Information Security Group, Smart Card Centre (Year: 2010).*

(Continued)

*Primary Examiner* — Eric T Wong
*Assistant Examiner* — Kevin T Poe
(74) *Attorney, Agent, or Firm* — Foley & Lardner LLP (57) ABSTRACT

A system and method of authenticating a payment transaction between a merchant and a customer in an electronic payment system are described. Transaction details presented by the merchant are received at a mobile electronic device, the customer is authenticated by means of an authentication token presented by the customer at an authentication terminal, and the geo-location of the mobile electronic device and the authentication terminal are compared to verify that the device and terminal are within a predefined geographical distance at the time the payment transaction is processed.

12 Claims, 4 Drawing Sheets

(56) References Cited

U.S. PATENT DOCUMENTS

| | | | |
|---|---|---|---|
| 2008/0053975 A1* | 3/2008 | Yamazaki | B23K 26/0823 219/121.78 |
| 2008/0059375 A1* | 3/2008 | Abifaker | G06Q 20/04 705/44 |
| 2008/0072064 A1* | 3/2008 | Franchi | G06F 21/32 713/186 |
| 2008/0208759 A1* | 8/2008 | Royyuru | G06Q 20/4012 705/72 |
| 2008/0307515 A1* | 12/2008 | Drokov | G06Q 20/32 726/7 |
| 2009/0164326 A1* | 6/2009 | Bishop et al. | 705/19 |
| 2009/0187492 A1* | 7/2009 | Hammad | G06Q 10/087 705/26.1 |
| 2009/0221299 A1* | 9/2009 | MacDonald et al. | 455/456.1 |
| 2009/0327134 A1* | 12/2009 | Carlson | G06Q 20/04 705/44 |
| 2010/0280948 A1* | 11/2010 | Cohen | 705/42 |
| 2011/0137804 A1 | 6/2011 | Peterson | |
| 2012/0216292 A1* | 8/2012 | Richardson et al. | 726/27 |
| 2013/0054417 A1* | 2/2013 | O'Donoghue | G06Q 20/02 705/26.43 |
| 2013/0132274 A1* | 5/2013 | Henderson et al. | 705/41 |
| 2013/0151358 A1* | 6/2013 | Ramalingam | 705/16 |
| 2013/0159119 A1* | 6/2013 | Henderson et al. | 705/21 |
| 2013/0198046 A1* | 8/2013 | Hammad | G06Q 40/10 705/30 |
| 2014/0012689 A1* | 1/2014 | Henderson et al. | 705/18 |
| 2014/0012757 A1* | 1/2014 | Henderson et al. | 705/44 |

FOREIGN PATENT DOCUMENTS

| | | |
|---|---|---|
| JP | 2003150883 | 5/2003 |
| WO | WO 95/20195 | 7/1995 |
| WO | WO 01/48714 | 7/2001 |
| WO | 03067506 A2 | 8/2003 |
| WO | WO2005104428 | 11/2005 |
| WO | 2009158570 A2 | 12/2009 |
| WO | WO-2009/158570 A2 | 12/2009 |
| WO | WO-2010/141456 A2 | 12/2010 |
| WO | WO2012010585 | 1/2012 |

OTHER PUBLICATIONS

Berbecaru, D, LRAP: "A Location-Based Remote Client Authentication Protocol for Mobile Environments", 2011, 2011 19th International Euromicro Conference on Parallel, Distributed and Network-Based Processing (Year: 2011).*

Bertino Elisa, Kirkpatrick Michael, Location-Based Access Control Systems for Mobile Users—Concepts and Research Directions, SPRINGL'11 (Year: 2011).*

The above patent documents were cited in a European Search Report dated Jun. 24, 2016, which is unclosed, that issued in the corresponding European Patent Application No. 12189811.8.

EPO Summons in EP Application No. 12189811.8 dated Apr. 23, 2019.

* cited by examiner

SYSTEM AND METHOD FOR AUTHENTICATING A PAYMENT TRANSACTION

FIELD OF THE INVENTION

This invention relates to a transaction payment system, and more particularly to a system and method for providing enhanced authentication of card payment transactions.

BACKGROUND OF THE INVENTION

Payment transaction systems that use a mobile data terminal to handle credit/debit card transactions for a merchant are known. Typically, the merchant's data terminal is a mobile smartphone, tablet computer or portable computing device with cellular data communication capabilities, such as General Packet Radio Service (GPRS), Enhanced Data rates for GSM Evolution (EDGE) or 3G ($3^{rd}$ generation mobile telecommunications technology), and capable of running a payment application. A payment card reader is also typically provided as a peripheral device in communication with the data terminal. The payment application preferably provides accounting functions for the merchant, such as calculating a total bill, printing receipts, providing summaries of transactions, etc. and can communicate electronically with a transaction processing back-end server to process and settle the transactions.

Examples of such known systems are described in GB No. 2427059 (Bristol Office Machines), EP No. 0741884 (mCom Solutions) and EP No. 1240631 (Swisscom Mobile AG).

As such card payment systems become more prevalent, there is a need for improved systems and techniques to provide greater security for transactions and reduce the risk of fraudulent use.

STATEMENTS OF THE INVENTION

According to one aspect of the present invention, there is provided a method and system for authenticating a payment transaction between a merchant and a customer in an electronic payment system. In accordance with the method and system transaction details presented by the merchant are received at a mobile electronic device, the customer is authenticated by an authentication token presented by the customer at a merchant authentication terminal, and the geo-locations of the mobile electronic device and the merchant authentication terminal are compared to verify that the mobile electronic device and merchant authentication terminal are within a predefined geographical distance at the time the payment transaction is processed.

In one embodiment, the merchant mobile electronic device and the merchant authentication terminal include a geo-location module to determine and provide a geographical location of the respective device.

In a further aspect of the present invention, there is provided a mobile electronic device, a token authenticator, a merchant system, and associated computer programs arranged to carry out the above method.

BRIEF DESCRIPTION OF THE DRAWINGS

There now follows, by way of example only, a detailed description of embodiments of the present invention, with references to the figures identified below.

FIG. 2, which comprises

DETAILED DESCRIPTION OF EMBODIMENTS OF THE INVENTION

Card Payment Background

Card payments are a way of paying for goods and services without cash changing hands. The presentation of the card details and an appropriate card holder authentication guarantees the merchant payment. A conventional card payment system is made up of a number of components: a card holder, a merchant, a merchant acquirer, a scheme and an card issuer. As is appreciated by those skilled in the art, the cardholder is the consumer purchasing goods or services with a card, the merchant is selling the goods or services to the consumer, the acquirer is an intermediary that functions to process the transaction on behalf of the merchant and card issuer, the scheme refers to the entity operating a specific transaction protocol (i.e., rules for the interchange) in which the cardholder, merchant, merchant acquirer and card issuer have agreed to participate, and the card issuer is the bank or other entity offering the cards directly to the consumer and ultimately assuming financial liability for the transaction by providing the cardholder with a line of credit.

In the normal process, the card holder presents his card (or token) to the merchant in order to pay for goods or services rendered; this transaction may take place over any one of a number of channels (in store or via the Internet, for example). The merchant, through his acquirer, is set up to accept different card types by scheme (Visa®, MasterCard®, Amex®, credit, debit, for example). When a card is presented, the card holder is authenticated (by Personal Identification Number, PIN, passcode, or Card Verification Value, CV2, for example), subject to channel and merchant capability, and the transaction is submitted to the merchant's acquirer (referred to herein as "merchant acquirer") for authorization. Authorization and authentication of the merchant and/or card holder may instead or additionally be handled through a trusted third party authentication system that is known to the merchant acquirer.

Once the transaction is received, the merchant acquirer routes the authorization transaction, in real time, to the relevant scheme based upon card type. The scheme provides isolation between merchant acquirers and card issuers for routing of authorisations, settlements and funds movement. The merchant acquirer doesn't need to know who the card issuer is, just which scheme to route it to, which is determined by Bank Identification Number (BIN).

The card issuer authorizes the transaction based upon the card holder's balance and other risk/fraud criteria and returns an authorised message and authorisation code to the scheme, which routes it back to the merchant acquirer who sends it to the merchant. The merchant then confirms the sale, which posts a settlement transaction to the merchant acquirer; this is a mandate to make the payment and move funds. The settlement transaction is routed between merchant acquirers and card issuers via the scheme.

Technical Architecture

Figure 1:
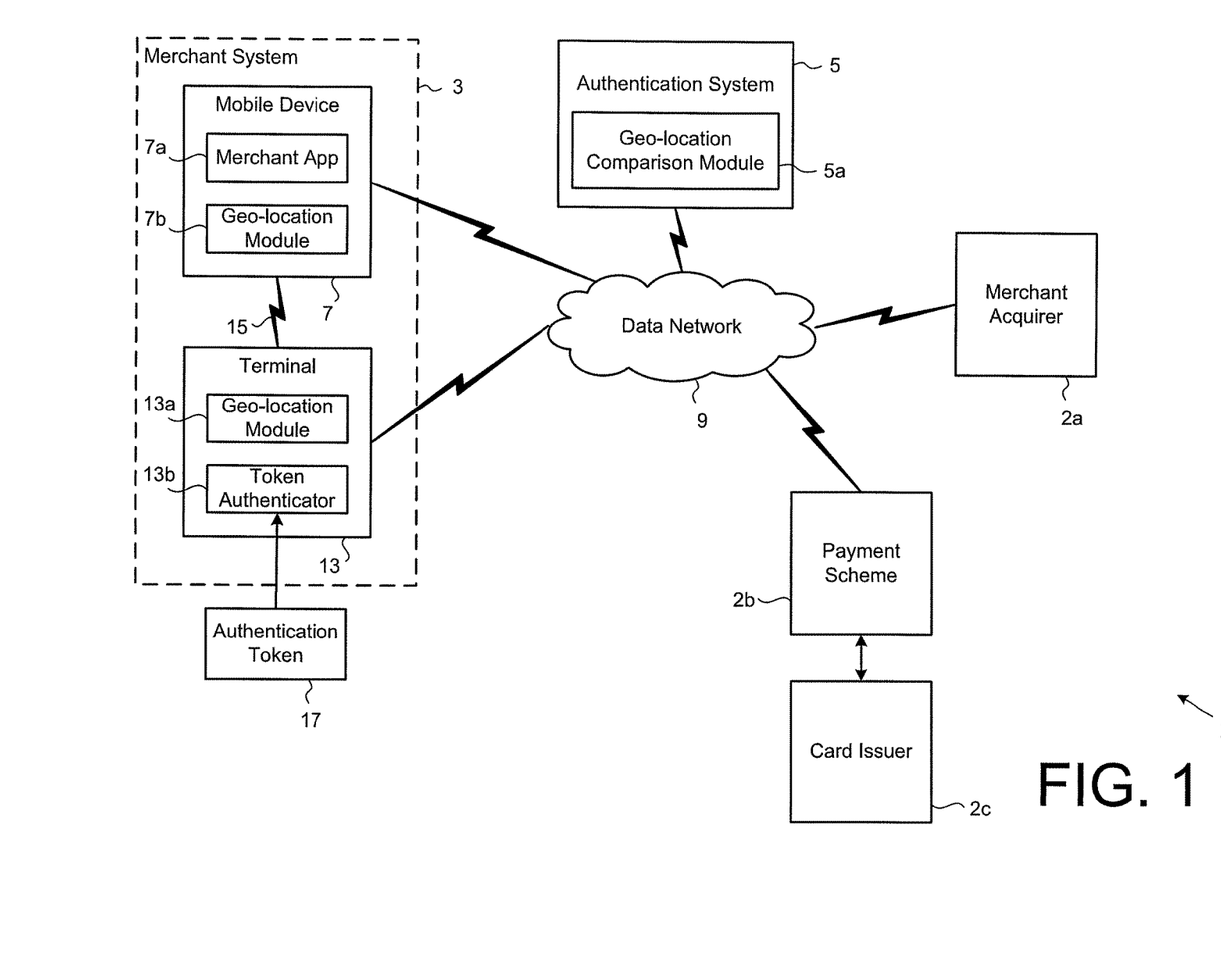
FIG. 1 is a block diagram showing the main components of a payment transaction system according to an embodiment of the invention.

Referring to FIG. 1, a payment transaction system 1, according to an embodiment of the invention is disclosed. The present transaction payment system provides a method of authenticating a payment transaction between a merchant and a customer in an electronic payment transaction system 1. The method includes receiving transaction details presented by the merchant at a mobile electronic device 7, verifying that the mobile electronic device 7 and an merchant authentication terminal 13 are within a predefined geographical distance at substantially a time the transaction details are received, and authenticating the customer by an authentication token 17 presented by the customer at the merchant authentication terminal 13.

With the foregoing methodology in mind, the present transaction payment system includes a merchant system 3 for handling payment transactions, such as credit/debit card transactions, through a merchant application 7a running on a mobile electronic device 7. In a typical payment transaction process, the merchant application 7a receives data identifying goods and/or services associated with the payment transaction, applies discounts or vouchers, determines the total amount due for payment, and initiates authentication of the customer's payment instrument. As will be appreciated based upon the following disclosure, the mobile electronic device is also provided with a geo-location module 7b.

Before the payment transaction can be settled and completed, the merchant application 7a communicates with a merchant authentication terminal 13 of the merchant system 3 to verify an authentication token 17 associated with a customer using a token authenticator 13b. In one embodiment, the authentication token 17 is a credit or debit card with an integrated chip and the token authenticator 13b is a card reader for receiving and verifying the card holder's PIN, passcode or CV2, as is known to those skilled in the art. It will be appreciated that any other form of token authentication can be used, such as a near field communication (NFC) mobile communication device, a mobile phone or portable computing device, or a biometric authentication device, for example. As with the mobile electronic device 7, the merchant authentication terminal also includes a geo-location module 13a.

The mobile electronic device 7 is a mobile smartphone, tablet computer or portable computing device, or the like, and communicates with the authentication system 5 via a data network 9. The merchant application 7a is secured by a passcode and information associated with a payment transaction can be provided via the secured merchant application 7a running on the mobile electronic device 7. Electronic data communication by the merchant application 7a can be encrypted.

The mobile electronic device 7 and the merchant authentication terminal 13 may communicate data over a data network 9. The data network 9 is any suitable data communication network such as a wireless network, a local- or wide-area network including a corporate intranet or the Internet, using for example the TCP/IP protocol, or a cellular communication network such as GPRS, EDGE or 3G, for example. Such communication protocols are of a type that are known per se in data networks and need not be described further. Additionally, or alternatively, the mobile electronic device 7 and the merchant authentication terminal 13 can be communicatively coupled via a direct communication path 15, for example a wired connection, a Bluetooth® connection or an infrared data connection.

Components of the merchant system 3 are also in communication with a merchant acquirer 2a, payment scheme 2b and card issuer 2c components over the data network 9. These components are typically provided for authorizing and settling card payment transactions as described in the section above, and need not be described further.

In this embodiment, an additional mutual authentication of the merchant system components is handled through an authentication system 5 hosted by a trusted third party that is known to the merchant acquirer 2a. Alternatively, the authentication system 5 may be provided as a component of the merchant acquirer 2a.

As will be described below, this mutual authentication, performed by the authentication system 5, includes a location-based security check prior to authorisation processing of a payment transaction. The geo-location modules 7b, 13a of the mobile electronic device 7 and the merchant authentication terminal 13 provide details identifying the physical locations of the respective components of the merchant system 3. The authentication system 5 includes a geo-location comparison module 5a that compares the physical locations of the merchant's mobile electronic device 7 and the merchant authentication terminal 13 to determine that the associated components of the merchant system 3 are within a predefined geographical proximity at the time of the payment transaction, and therefore that the merchant authentication terminal 13 is being used by a legitimate merchant. The authentication system 5 stores data identifying associations between registered merchant system 3 components, for example, as a database of unique machine identification numbers for associated merchant mobile electronic devices and terminals.

In this embodiment, the geo-location modules 7b, 13a are Global Positioning System (GPS) receivers of a type that are known to those skilled in the art for determining the physical location of the respective mobile electronic device 7 and merchant authentication terminal 13, and need not be described further. Additionally or alternatively, it is appreciated the geo-location modules can determine the physical locations using any other known technique, for example based on network information (e.g. network-, handset-, SIM- or hybrid-based techniques).

Location-based Transaction Verification

Figure 2A:
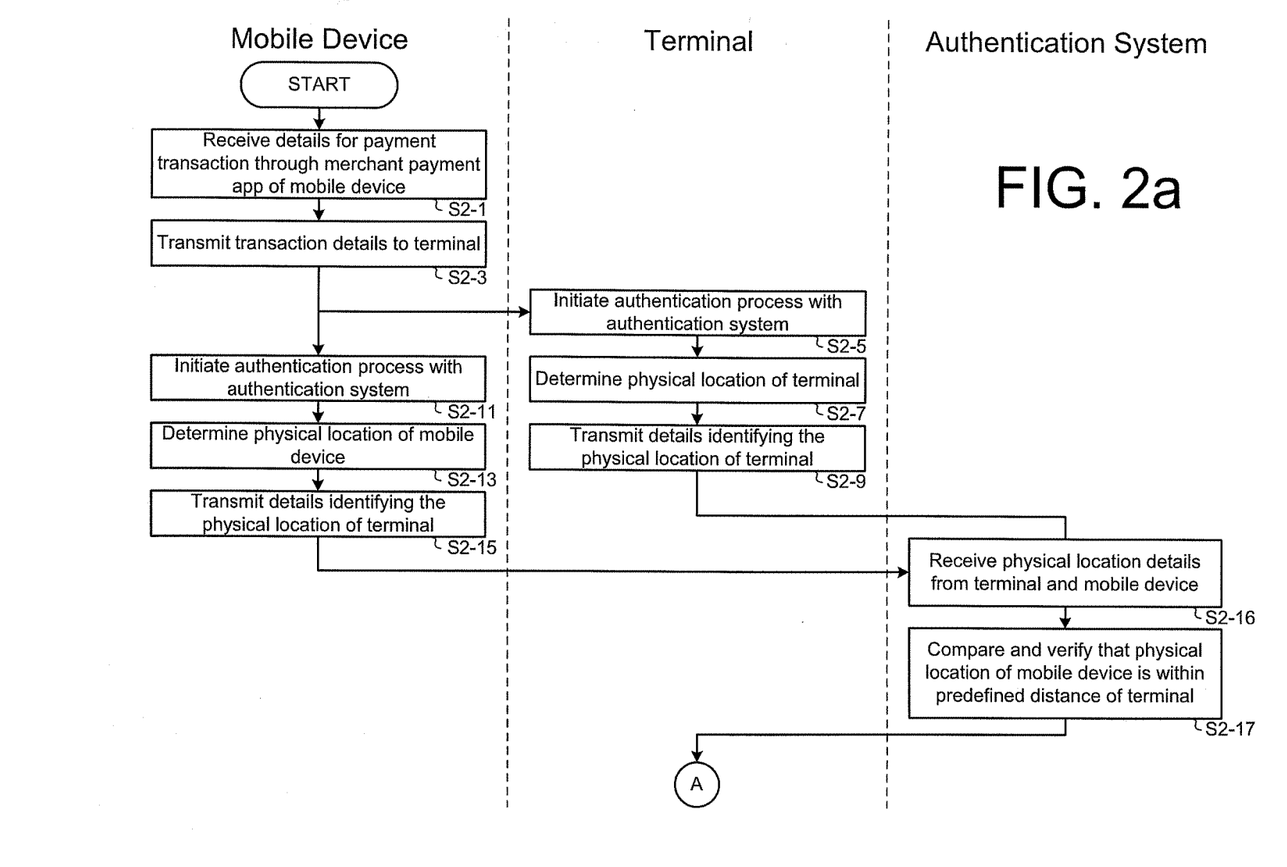
FIGS. 2a and 2b, is a flow diagram illustrating the main processing steps performed by the system of FIG. 1.
Figure 2B:
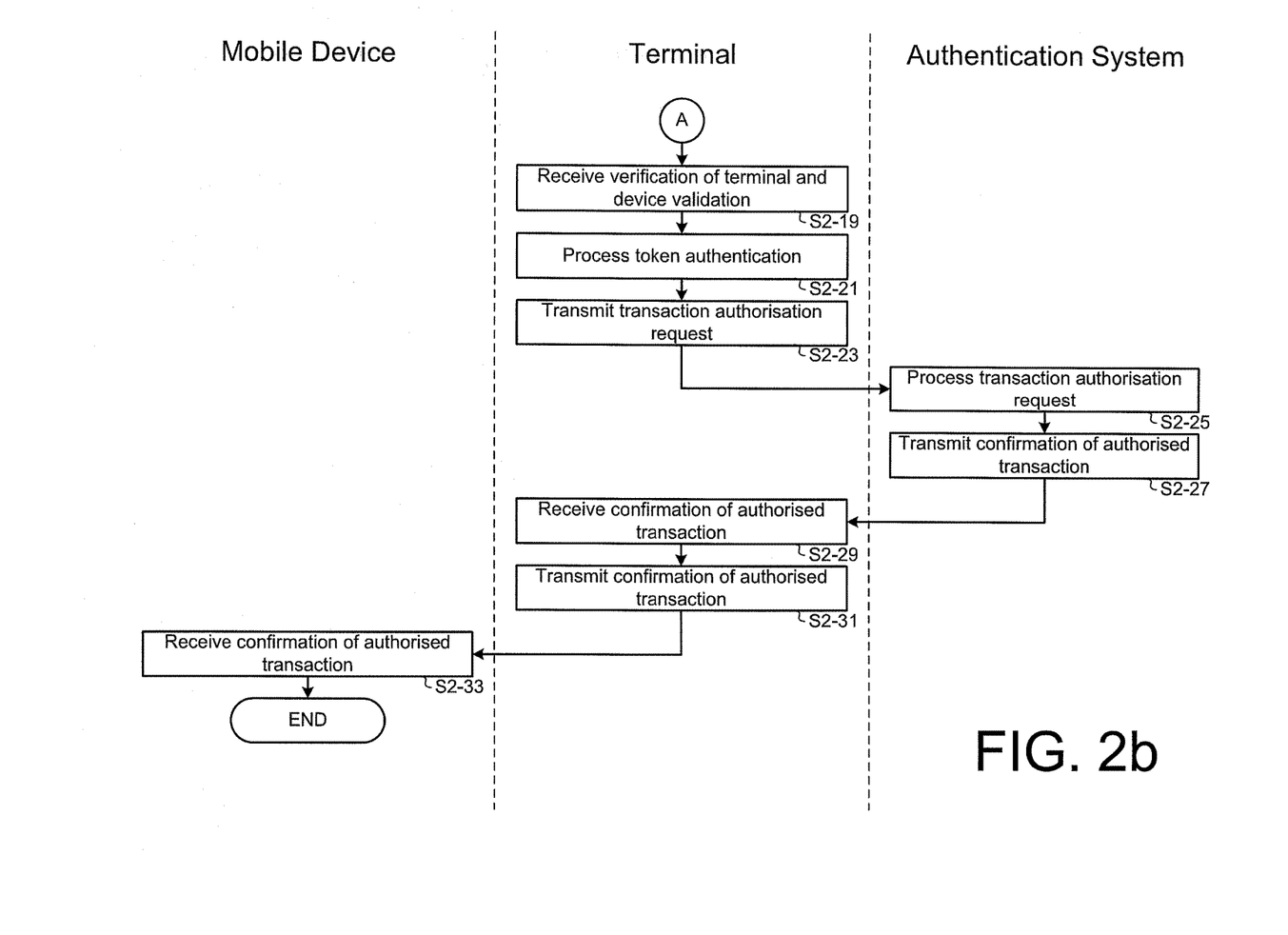

An example of a process of providing transaction receipt details to a customer will now be described with reference to FIG. 2, to illustrate the technical advantage of the payment transaction system embodiment described above.

The process begins at step S2-1 where the merchant system 3 receives details for a new payment transaction through the merchant payment application 7a running on the mobile electronic device 7. The transaction details include a payment amount to be transferred and data identifying the transaction, such as the time and date of the transaction and a description of the associated goods or services. The transaction details may also include details identifying the card holder and payment card. At step S2-3, the mobile electronic device 7 transmits the transaction details to the merchant authentication terminal 13, which will handle the transaction authorisation process.

In response to receiving data identifying a new transaction, the merchant authentication terminal 13 initiates at step S2-5 an authentication process with the authentication system 5. Typically, the authentication process involves establishing a communications link over the data network 9 in accordance with an agreed handshaking protocol, and transferring information identifying the merchant authentication terminal 13 to the authentication system 5. At step S2-7, the merchant authentication terminal 13 uses the geo-location module 13a to determine the physical location of the merchant authentication terminal 13 at the time of the current payment transaction. The merchant authentication terminal 13 then transmits data identifying the physical location of the merchant authentication terminal 13 to the authentication system 5.

In this embodiment, the mobile electronic device 7 also initiates an authentication process with the authentication system 5 at step S2-11, after transmitting the transaction details to the terminal. Alternatively, the mobile electronic device 7 may wait for and respond to a request from the authentication system 5 for details to verify the mobile electronic device 7. Accordingly, at step S2-13, the mobile electronic device 7 determines the physical location of the mobile electronic device 7 using its geo-location module 7b. The mobile electronic device 7 then transmits at step S2-15 data identifying the physical location of the mobile electronic device 7 to the authentication system 5.

At step S2-16, the authentication system 5 receives the respective physical location details from both components of the merchant system 3. At step S2-17, the authentication system 5 uses the geo-location comparison module 5a to compare and verify that the physical location of the mobile electronic device 7 is within a predefined geographic distance of the merchant authentication terminal 13. This can be calculated by determining that the linear distance between the mobile electronic device 7 and the merchant authentication terminal 13 is less than a predefined threshold distance. It will be appreciated that the threshold distance may be set based on the physical dimensions of the merchant store. It will also be appreciated that the respective times that the physical locations are determined can be compared with the time of the present payment transaction to ensure that the merchant system 3 components are within the predefined proximity at substantially the same time the payment transaction is being processed.

Although not illustrated, if the authentication system 5 determines that the mobile electronic device 7 and the merchant authentication terminal 13 are at different locations, the payment transaction can be flagged as potentially fraudulent and handled by the authentication system 5 based on predefined fraud tolerance rules and procedures. For example, if fraud is suspected, then a communication could be issued to the registered merchant account details, for example by SMS or e-mail, alerting the merchant that a potentially fraudulent transaction has taken place. The transaction can also be prevented from being authorized and the merchant advised of this status via SMS or e-mail.

At step S2-19, the merchant authentication terminal 13 receives confirmation of authentication from the authentication system 5 after verification of the location-based security check, indicating that the merchant authentication terminal 13 is allowed to proceed with validation of the authentication token 17 as the next stage of the payment transaction process. Therefore, at step S2-21, the merchant authentication terminal 13 carries out the token authentication process using the token authenticator 13b, for example, to verify the customer's credit or debit card using a card reader to receive and verify the card holder's PIN, passcode or CV2, as is known to those skilled in the art. After the authentication token 17 has been verified, the merchant authentication terminal 13 transmits at step S2-23 a transaction authorization request to the authentication system 5.

The authentication system 5 processes the transaction authorisation request at step S2-25 in the normal manner as is known in the art, and transmits confirmation of the authorised transaction back to the merchant authentication terminal 13 at step S2-27. At step S2-29, the merchant authentication terminal 13 receives confirmation of the authorized transaction and likewise transmits confirmation of the authorised transaction to the mobile electronic device 7 at step S2-31. At step S2-33, the mobile electronic device 7 receives confirmation of the authorised transaction and can store and/or display details of the completed payment transaction.

In this way, acquirers and merchants in the payment transaction system are provided with enhanced security and confidence that any lost or stolen token authenticator devices are rendered unusable by fraudulent persons or persons other than the genuine merchant registered with the token authenticator.

Computer Systems

Figure 3:
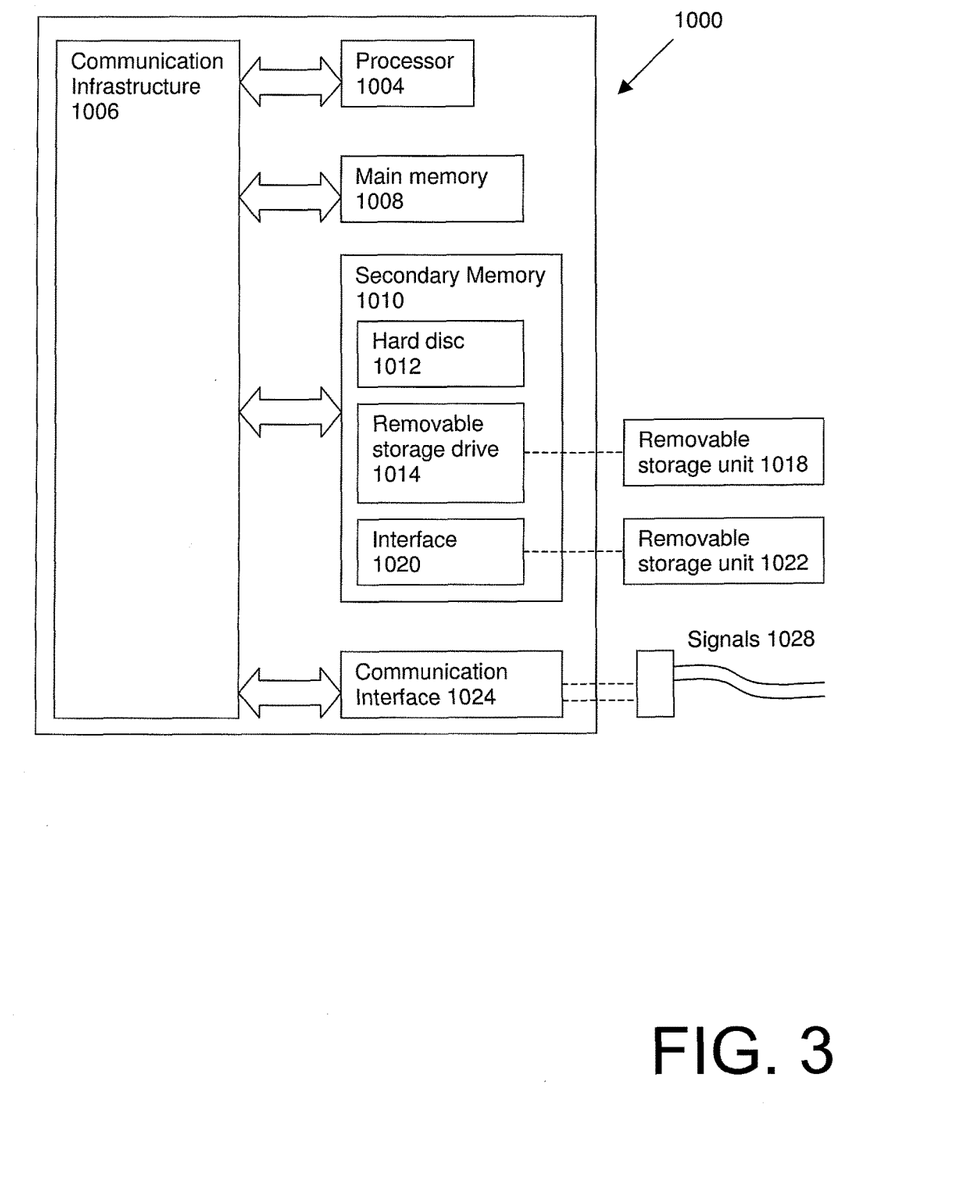
FIG. 3 is a diagram of an exemplary computer system on which one or more of the functions of the embodiment may be implemented.

The entities described herein, such as the transaction processing module of the merchant system, may be implemented by computer systems such as the computer system 1000 as shown in FIG. 3. Embodiments of the present invention may be implemented as programmable code for execution by such computer systems 1000. After reading this description, it will become apparent to a person skilled in the art how to implement the invention using other computer systems and/or computer architectures.

The computer system 1000 includes one or more processors, such as processor 1004. Processor 1004 may be any type of processor, including but not limited to a special purpose or a general-purpose digital signal processor. The processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

The computer system 1000 also includes a main memory 1008, preferably a random access memory (RAM), and may also include a secondary memory 610. The secondary memory 1010 may include, for example, a hard disk drive 1012 and/or a removable storage drive 1014, such as a floppy disk drive, a magnetic tape drive, or an optical disk drive, etc. The removable storage drive 1014 reads from and/or writes to a removable storage unit 1018 in a well-known manner. The removable storage unit 1018 can be a floppy disk, a magnetic tape, an optical disk, etc., which is read by and written to a removable storage drive 1014. As will be appreciated, the removable storage unit 1018 includes a computer usable storage medium having stored therein computer software and/or data.

In alternative implementations, a secondary memory 1010 may include other similar means for allowing computer programs or other instructions to be loaded into the computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from the removable storage unit 1022 to the computer system 1000. Alternatively, the program may be executed and/or the data accessed from the removable storage unit 1022, using the processor 1004 of the computer system 1000.

Computer system 1000 may also include a communication interface 1024. The communication interface 1024 allows software and data to be transferred between the computer system 1000 and external devices. Examples of the communication interface 1024 may include a modem, a network interface (such as an Ethernet card), a communication port, a Personal Computer Memory Card International Association (PCMCIA) slot and card, etc. Software and data transferred via the communication interface 1024 are in the form of signals 1028, which may be electronic, electromagnetic, optical, or other signals capable of being received by communication interface 1024. These signals 1028 are provided to communication interface 1024 via a communication path 1026. The communication path 1026 carries signals 1028 and may be implemented using wire or cable, fiber optics, a phone line, a wireless link, a cellular phone link, a radio frequency link, or any other suitable communication channel. For instance, the communication path 1026 may be implemented using a combination of channels.

The terms "computer program medium" and "computer usable medium" are used generally to refer to media such as a removable storage drive 1014, a hard disk installed in a hard disk drive 1012, and signals 1028. These computer program products are means for providing software to a computer system 1000. However, these terms may also include signals (such as electrical, optical or electromagnetic signals) that embody the computer program disclosed herein.

Computer programs (also called computer control logic) are stored in the main memory 1008 and/or the secondary memory 1010. Computer programs may also be received via a communication interface 1024. Such computer programs, when executed, enable the computer system 1000 to implement embodiments of the present invention as discussed herein. Accordingly, such computer programs represent controllers of the computer system 1000. Where the embodiment is implemented using software, the software may be stored in a computer program product and loaded into the computer system 1000 using the removable storage drive 1014, the hard disk drive 1012, or the communication interface 1024, to provide some examples.

Alternative embodiments may be implemented as control logic in hardware, firmware, or software or any combination thereof.

Alternative Embodiments

It will be understood that embodiments of the present invention are described herein by way of example only, and that various changes and modifications may be made without departing from the scope of the invention.

For example, in the exemplary embodiment described above, location data is transmitted as part of an authentication process by an authentication system. As those skilled in the art will appreciate, as an alternative, the token authenticator and the mobile electronic device can be configured to transmit respective location data to the authentication system at predefined intervals, to update respective tracked locations in a database. The authentication system can then carry out the location-based security check based on the stored current known location of each device without delay.

In the embodiment described above, the mutual authentication process includes a location-based security check. As those skilled in the art will appreciate, the authentication process may additionally include other forms of security and authentication checks, such as biometric identification and verification of the registered owner of the mobile electronic device, terminal and/or authentication token.

In the embodiment described above, the terminal and the mobile electronic device determine their respective physical locations at the time of the payment transaction and transmit details of the location to the remote authentication system for mutual validation. As an alternative, the terminal of the merchant system can instead transmit details of its physical location at the time of the payment transaction to the merchant mobile electronic device, and the mobile electronic device can instead determine that the merchant system components are within the predefined proximity at the time of the payment transaction, and inform the authentication system accordingly. As a further alternative, the terminal can instead receive the physical location of the mobile electronic device and perform the location-based security check before informing the authentication system accordingly.

In the embodiment described above, the mobile electronic devices stores and runs a plurality of application modules (also referred to as computer programs or software) in memory, which when executed, enable the mobile electronic device to implement the functionality as discussed herein. As those skilled in the art will appreciate, the software may be stored in a computer program product and loaded into the mobile electronic device using any known instrument, such as removable storage disk or drive, hard disk drive, or communication interface, to provide some examples.

What is claimed is:

1. A computer-implemented method comprising:
   receiving over a computer network, by an automated authentication system, transaction details from a mobile point of sale device, along with a time that said transaction details were received by the mobile point of sale device;
   receiving, from a first location determining device of the mobile point of sale device, first location information describing a geographical location of the mobile point of sale device;
   receiving, from a second location determining device of a token authenticator device, second location information describing a geographical location of the token authenticator device separate from and communicatively coupled to the mobile point of sale device, the token authenticator device comprising a token reader device for verifying an authentication token;
   determining, by the automated authentication system, based on the received first and second location information, transaction details, and time that said transaction details were received, if the mobile point of sale device and the token authenticator device are within a predefined geographical distance of each other at the time that said transaction details are received;
   in response to determining that said devices are within the predefined geographical distance of each other, enabling the token reader device of the token authenticator device to proceed with verification of the authentication token using the token authenticator; and
   in response to determining that said devices are not within the predefined geographical distance of each other, transmitting command data to render the token authenticator device unusable.

2. The method of claim 1, wherein the automated authentication system verifies that the merchant mobile point of sale device and the separate token authenticator device are within the predefined geographical distance at substantially the time the transaction details are received.

3. The method of claim 1, further comprising transmitting a transaction authorization request after the authentication token is authenticated.

4. The method of claim 3, wherein the step of authenticating the authentication token further includes verifying a code entered to the separate token authenticator device.

5. The method of claim 1, further comprising calculating a distance between the geographical location of the separate token authenticator device and the geographical location of the mobile point of sale device.

6. The method of claim 5, wherein the mobile point of sale device and the separate token authenticator device are mutually authenticated when the geographical location of the separate token authenticator device and the geographical location of the mobile point of sale device are within a predefined distance and a time stamp of the geographical location of the separate token authenticator device and the geographical location of the mobile point of sale device is within a predefined time window from the time the transaction details are received by the automated authentication system.

7. The method of claim 5, wherein the geographical location of the separate token authenticator device and the geographical location of the mobile point of sale device are tracked at predefined intervals.

8. The method of claim 1, wherein verifying that the mobile point of sale device and the separate token authenticator device are within the predefined geographical distance is performed by an automated authentication system of a merchant acquirer or a trusted third party associated with the merchant acquirer.

9. The method of claim 8, further comprising storing data associated with the mobile point of sale device and the separate token authenticator device in a database of the automated authentication system.

10. The method of claim 1, wherein the transaction details provided by the mobile point of sale device are provided via a secure application running on the mobile point of sale device.

11. The method of claim 10, wherein the secure application is secured by means of a passcode.

12. An apparatus comprising:
a mobile point of sale device comprising:
a mobile point of sale storage unit;
a merchant application stored on the mobile point of sale storage unit,
a mobile point of sale processor, configured to execute the merchant application and further configured to cause the mobile point of sale device to receive and transmit details of a transaction, along with a time that said transaction details were received by the mobile point of sale device; and
a first location determining device configured to detect a geographical location of the mobile point of sale device; and
a token authenticator device separate from and communicatively coupled via a direct communication path to the mobile point of sale device, the token authenticator device comprising:
a token reader device configured to verify an authentication token associated with the transaction; and
a second location determining device configured to detect a geographical location of the token authenticator device,
wherein the mobile point of sale device and the token authenticator device are in communication over a computer network with a computer configured to:
determine, based on received first location information describing the geographical location of the mobile point of sale device, said transaction details, time that said transaction details were received, and received second location information describing the geographical location of the token authenticator device, if the mobile point of sale device and the token authenticator device are within a predefined geographical distance of each other at the time that said transaction details were received;
in response to determining that said devices are within the predefined geographical distance of each other, enable the token reader device of the token authenticator device to verify the authentication token; and
in response to determining that said devices are not within the predefined geographical distance of each other, transmit command data to render the token authenticator device unusable.

* * * * *